J. H. HAMMOND, Jr.
SYSTEM OF TELEDYNAMIC CONTROL.
APPLICATION FILED JAN. 21, 1913. RENEWED FEB. 19, 1919.
1,319,678.
Patented Oct. 21, 1919.
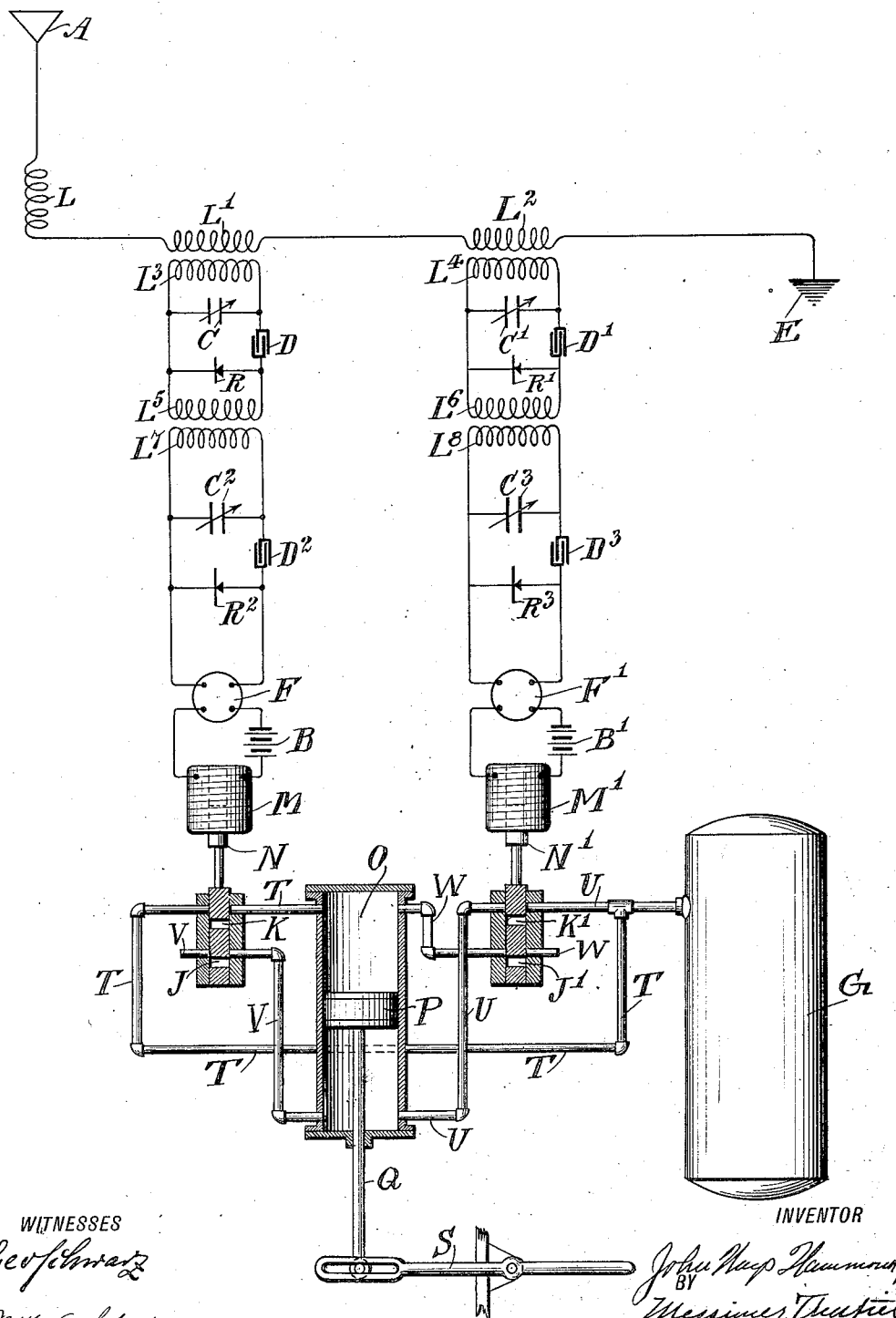

UNITED STATES PATENT OFFICE.

JOHN HAYS HAMMOND, JR., OF GLOUCESTER, MASSACHUSETTS.

SYSTEM OF TELEDYNAMIC CONTROL.

1,319,678.         Specification of Letters Patent.        Patented Oct. 21, 1919.

Application filed January 21, 1913, Serial No. 743,271. Renewed February 19, 1919. Serial No. 278,107.

*To all whom it may concern:*

Be it known that I, JOHN HAYS HAMMOND, Jr., a citizen of the United States, residing at Gloucester, in the State of Massachusetts, have invented certain new and useful Improvements in Systems of Teledynamic Control, of which the following is a specification, reference being had to the accompanying drawing, forming a part thereof.

This invention relates to systems for controlling and operating mechanisms from a distance, and relates more particularly to systems in which pneumatic or hydraulic machinery for operating the steering gear and engines of torpedoes and other vessels and the like, is controlled by radiant energy transmitted from a distant station.

The accompanying drawing shows, in diagrammatic form, a receiving station on my system, which may be located on a torpedo or other vessel. It is to be understood that there is a corresponding transmitting station, capable of sending out electric waves of several predetermined lengths, said waves having several predetermined frequencies of amplitude variation or several predetermined group frequencies.

In the drawing, A is a receiving antenna, connected to earth at E through the inductance coils L, $L^1$ and $L^2$.

Oscillation circuit $L^3$ C, comprising the inductance coil $L^3$ and the variable condenser C, is inductively coupled to the antenna circuit by means of the coils $L^1$ and $L^3$, and is tuned to one of the wave lengths of the transmitting station. Oscillation circuit $L^3$ C, by means of the stopping condenser D and the rectifier R, transmits unidirectional current impulses to the coil $L^5$, said current impulses having a frequency corresponding to one of the wave-amplitude-variation frequencies or to one of the wave-group frequencies of the transmitting station. Oscillation circuit $L^7$ $C^2$, comprising the inductance coil $L^7$ and the variable condenser $C^2$, is tuned to this same frequency of wave amplitude variation or wave group, and is inductively coupled to coil $L^5$ by means of coil $L^7$. By means of stopping condenser $D^2$ and rectifier $R^2$, the oscillation circuit $L^7$ $C^2$ supplies unidirectional current impulses to relay F. When relay F is actuated, it causes electromagnet M to be energized by means of the battery B, and the core or plunger N is attracted. Under the control of plunger N are the ports K and J, which open and close pipes T and V, respectively. Pipe T leads from the tank or reservoir G to the cylinder O, and pipe V is an exhaust pipe from cylinder O. Tank G contains compressed air or other suitable fluid under pressure. Piston P, in cylinder O, is connected, by means of piston rod Q, with the helm S, which is attached to the rudder of the torpedo or other vessel.

Oscillation circuit $L^4$ $C^1$, comprising the inductance coil $L^4$ and the variable condenser $C^1$, is inductively coupled to the antenna circuit by means of the coils $L^2$ and $L^4$, and is tuned to a second wave length of the transmitting station different from the wave length of oscillation circuit $L^3$ C. Oscillation circuit $L^4$ $C^1$, by means of the stopping condenser $D^1$ and the rectifier $R^1$, transmits unidirectional current impulses to the coil $L^6$, said current impulses having a frequency corresponding to a second wave-amplitude-variation frequency or wave-group frequency of the transmitting station. Oscillation circuit $L^8$ $C^3$, comprising the inductance coil $L^8$ and the variable condenser $C^3$, is tuned to this same amplitude-variation frequency, which is different from the frequency of oscillation circuit $L^7$ $C^2$. Circuit $L^8$ $C^3$, by means of coil $L^8$, is inductively coupled to coil $L^6$, and, by means of stopping condenser $D^3$ and rectifier $R^3$, it supplies unidirectional current impulses to relay $F^1$. When relay $F^1$ is actuated, it causes electromagnet $M^1$ to be energized by means of the battery $B^1$, and the core or plunger $N^1$ is attracted. Under the control of plunger $N^1$ are the ports $K^1$ and $J^1$ which open and close pipes U and W, respectively. Pipe U leads from the tank G to the cylinder O, and pipe W is an exhaust pipe from cylinder O.

When the system is at rest the pipes T, U, V and W are all closed. When electric waves, having a wave length corresponding to that of oscillation circuit $L^3$ C, and an amplitude-variation frequency corresponding to the frequency of oscillation circuit $L^7$ $C^2$, are received at the receiving station, relay F and electromagnet M will be energized, plunger N will be attracted and ports K and J will open pipes T and V, respectively. Compressed air, or other working fluid, will then enter the upper part of cylinder O from tank G, the contents of the lower part of cylinder O will exhaust through pipe V, and the piston P will move downward. Piston rod Q will then move helm S to one side, the rudder will be deflected, and the torpedo or other vessel will turn in one direction.

On the other hand, when electric waves having a wave length corresponding to that of oscillation circuit $L^4$ $C^1$, and an amplitude-variation frequency corresponding to the frequency of oscillation circuit $L^8$ $C^3$, are received at the receiving station, relay $F^1$ and electromagnet $M^1$ will be energized, plunger $N^1$ will be attracted and parts $K^1$ and $J^1$ will open pipes U and W, respectively. Compressed air or other working fluid, will then enter the lower part of cylinder O from tank G, the contents of the upper part of cylinder O will exhaust through pipe W, and the piston P will move upward. Piston rod Q will then move helm S to the opposite side, and the rudder will be deflected accordingly, and the torpedo or other vessel will turn in the direction opposite from before.

When a signal or impulse from the transmitting station ceases, the oscillation circuits, relay and electromagnet which have been active will be deënergized, the corresponding plunger and ports will return to their original positions and the pipes leading into and out of the cylinder O will be closed. In this way the movement of the helm and the course of the torpedo or other vessel can be controlled from the distant transmitting station. The arrangement of the apparatus here shown may be altered as found suitable in any given case, and I do not limit myself to the use of air as a working fluid, but may use any other suitable gas or any suitable liquid, nor do I limit myself to a steering device for torpedoes or other vessels, but may put my invention to any use desired; and in general I do not confine myself to the particular apparatus and mechanisms here shown, but various changes and modifications, within the capacity of those skilled in the art, may be made in the particular apparatus shown and described herein, without departing from the spirit of my invention provided the means set forth in the following claims be employed.

Having thus described my invention, I claim:—

1. A system for controlling moving bodies by radiant energy comprising in combination a moving body having functioning means thereon, a fluid receiving cylinder, a piston arranged to reciprocate in said cylinder, and operatively connected to said functioning means, a source of fluid pressure, and means controlled by radiant energy for selectively permitting pressure from said source to enter either end of said cylinder and at the same time permitting the other end of said cylinder to be free to exhaust, said ends of said cylinder being normally closed.

2. A system for utilizing radiant energy comprising in combination, a plurality of receiving circuits responsive selectively to predetermined contrasting emissions of radiant energy, valves respectively controlled by said circuits, fluid operated prime moving means having motion transmitting means movable thereby in contrasting directions, and means respectively controlled through the instrumentality of said circuits to initiate by said valves the operation of said prime moving means for effecting said movements, said valves being normally arranged to cause any motion of said motion transmitting means to be resisted by a confined fluid.

3. A system for utilizing radiant energy comprising in combination, a plurality of receiving circuits responsive selectively to predetermined contrasting emissions of radiant energy, valves respectively controlled by said circuits, fluid operated prime moving means having motion transmitting means movable thereby in contrasting directions, and means respectively controlled through the instrumentality of said circuits to initiate by said valves the operation of said prime moving means for effecting said movements, said valves being normally arranged to cause any motion of said motion transmitting means to be resisted by a confined atmospheric pressure.

4. A system for utilizing radiant energy, comprising in combination a plurality of receiving circuits responsive selectively to predetermined contrasting emissions of radiant energy, fluid operated prime moving means having motion transmitting means movable thereby in contrasting directions, and means respectively controlled through the instrumentality of said circuits to initiate the operation of said prime moving means for effecting said movements, said third mentioned means being normally so arranged that any movement of said motion transmitting means is normally opposed as a result of such arrangement.

5. A system for utilizing radiant energy comprising in combination, an aerial circuit responsive to radiant energy, a plurality of closed oscillatory receiving circuits arranged to be independently energized by said aerial circuit and responsive selectively to contrasting impulses of radiant energy fluid operated prime moving means having motion transmitting means movable thereby in contrasting directions, a source of fluid pressure for said prime moving means, and means respectively controlled by said oscillatory receiving circuits respectively to cause said prime moving means to actuate said motion transmitting means in said contrasting directions.

6. A system for utilizing radiant energy comprising in combination, an aerial circuit responsive to radiant energy, a plurality of closed oscillatory receiving circuits directly coupled to and arranged to be independently energized by said aerial circuit and responsive selectively to contrasting impulses of radiant energy fluid operated prime moving means having motion transmitting means movable thereby in contrasting directions, a source of fluid pressure for said prime moving means, and means respectively controlled by said oscillatory receiving circuits respectively to cause said prime moving means to actuate said motion transmitting means in said contrasting directions.

7. A system for controlling moving bodies by radiant energy comprising in combination a dirigible body having steering means thereon, a fluid receiving cylinder, a piston arranged to reciprocate in said cylinder and operatively connected to said steering means, a source of fluid pressure, and means responsive to impulses of radiant energy for selectively permitting pressure to enter either end of said cylinder from said source and at the same time permitting the other end of said cylinder to be free to exhaust, both ends of said cylinder being normally closed.

8. A system for controlling moving bodies by radiant energy comprising in combination a dirigible body having steering means thereon, a fluid receiving cylinder, a piston arranged to reciprocate in said cylinder and operatively connected to said steering means, a source of fluid pressure, and means including a pair of valves separately and selectively responsive to predetermined contrasting impulses of radiant energy for selectively permitting pressure to enter either end of said cylinder from said source and at the same time permitting the other end of said cylinder to be free to exhaust, both ends of said cylinder being normally closed.

9. The combination with a cylinder, of a piston arranged to reciprocate therein, a source of fluid pressure, a valve movable to admit pressure from said source into one end of said cylinder and to simultaneously permit air to exhaust from the other end of said cylinder, a valve movable independently of said first mentioned valve and movable to admit pressure from said source into said last mentioned end of said cylinder and to simultaneously permit air to exhaust from said first mentioned end of said cylinder, said valves being normally arranged to close both ends of said cylinder.

10. The combination with a cylinder, of a piston arranged to reciprocate therein, a source of fluid pressure, a valve movable to admit pressure from said source into one end of said cylinder and to simultaneously permit air to exhaust from the other end of said cylinder, a valve movable independently of said first mentioned valve and movable to admit pressure from said source into said last mentioned end of said cylinder and to simultaneously permit air to exhaust from said first mentioned end of said cylinder, said valves being normally arranged to close both ends of said cylinder, and means including an open aerial circuit responsive to radiant energy and a pair of closed oscillatory receiving circuits tuned to respond selectively to predetermined contrasting impulses of radiant energy received by said open circuit for actuating said valves selectively.

This specification signed and witnessed this 11th day of January, A. D., 1913.

JOHN HAYS HAMMOND, Jr.

Signed in the presence of—
M. P. WINNE,
OLIVE B. KING.